(12) United States Patent
McKeown

(10) Patent No.: US 7,201,133 B2
(45) Date of Patent: Apr. 10, 2007

(54) INTERNAL COMBUSTION ENGINE HAVING DUAL PISTON CYLINDERS AND LINEAR DRIVE ARRANGEMENT

(75) Inventor: Steve McKeown, Campbellford (CA)

(73) Assignee: 3rd Millennium Solutions, Ltd., Campbellford, Ontario (CA)

( * ) Notice: Subject to any disclaimer, the term of this patent is extended or adjusted under 35 U.S.C. 154(b) by 7 days.

(21) Appl. No.: 10/872,224

(22) Filed: Jun. 18, 2004

(65) Prior Publication Data

US 2004/0261750 A1 Dec. 30, 2004

Related U.S. Application Data

(60) Provisional application No. 60/480,293, filed on Jun. 20, 2003.

(51) Int. Cl.
*F02B 75/22* (2006.01)
*F02B 75/24* (2006.01)
*F02B 75/32* (2006.01)

(52) U.S. Cl. .................... 123/197.1; 123/55.5

(58) Field of Classification Search ............... 123/53.4, 123/54.4, 55.5, 55.7, 197.1, 197.3, 197.4, 123/55.3, 56.1–56.9
See application file for complete search history.

(56) References Cited

U.S. PATENT DOCUMENTS

| | | | | |
|---|---|---|---|---|
| 1,399,666 A | * | 12/1921 | Short | ......................... 123/55.7 |
| 3,835,823 A | | 9/1974 | Miller | |
| 3,868,932 A | * | 3/1975 | Toth | ......................... 123/53.4 |
| 3,925,217 A | | 12/1975 | Green et al. | |
| 4,013,048 A | | 3/1977 | Reitz | |
| 4,395,977 A | | 8/1983 | Pahis | |
| 4,683,805 A | | 8/1987 | Fejes | |
| 4,803,964 A | | 2/1989 | Kurek et al. | |
| 4,915,019 A | | 4/1990 | Hovaguimian | |
| 4,941,396 A | * | 7/1990 | McCabe | ....................... 92/136 |
| 5,103,778 A | * | 4/1992 | Usich, Jr. | ................... 123/56.8 |

(Continued)

FOREIGN PATENT DOCUMENTS

DE        24 40 660        4/1976

(Continued)

OTHER PUBLICATIONS

Patent Abstracts of Japan, vol. 2002, No. 05, May 3, 2002 & JP 2002-020778A, publication date: Jan. 23, 2002.

*Primary Examiner*—Stephen K. Cronin
*Assistant Examiner*—Hyder Ali
(74) *Attorney, Agent, or Firm*—Pearne & Gordon LLP (57) ABSTRACT

A device for transforming an alternating motion of a piston into a circular motion of a shaft is provided. The device includes an assembly of two pistons connected by two racks alternatively in mesh with a toothed cam set on a shaft. Movement in one direction of the assembly formed by piston and racks, following an explosion in one of the cylinders, causes one of the racks to mesh with the toothed sector and to rotate the shaft. At the end of this meshing period, the cam cooperates with a roller of one of the pistons so as to ensure continuity of the drive. Then, the explosion occurs in the other cylinder causing movement of the assembly in an opposite direction and so meshing of the other rack with toothed cam set, continuing the transformation of power to the shaft.

21 Claims, 7 Drawing Sheets

U.S. PATENT DOCUMENTS

| | | |
|---|---|---|
| 5,347,960 A | 9/1994 | Tokumi |
| 5,357,911 A | 10/1994 | Lindblad |
| 5,375,566 A | 12/1994 | Brackett |
| 5,517,953 A | 5/1996 | Wiesen |
| 5,526,779 A | 6/1996 | Harrington |
| 5,535,715 A | 7/1996 | Mouton |
| 5,546,897 A | 8/1996 | Brackett |
| 5,553,574 A | 9/1996 | Duncalf |
| 5,640,881 A * | 6/1997 | Brackett .................. 74/49 |
| 5,673,665 A | 10/1997 | Kim |
| 5,765,512 A | 6/1998 | Fraser |
| 5,782,213 A | 7/1998 | Pedersen |
| 5,934,229 A | 8/1999 | Li et al. |
| 6,397,794 B1 * | 6/2002 | Sanderson et al. ........ 123/48 B |

FOREIGN PATENT DOCUMENTS

| | | |
|---|---|---|
| DE | 140 776 | 3/1980 |
| GB | 1 319 031 | 5/1973 |

* cited by examiner

PISTON TRAVEL

INTERNAL COMBUSTION ENGINE HAVING DUAL PISTON CYLINDERS AND LINEAR DRIVE ARRANGEMENT

This application claims the benefit of U.S. Provisional Patent Application Ser. No. 60/480,293 filed Jun. 20, 2003.

FIELD OF THE INVENTION

The present invention relates generally to internal combustion engines, and more particularly, to an internal combustion engine that converts reciprocating piston motion into rotary crankshaft motion.

BACKGROUND OF THE INVENTION

A conventional, commercially available internal combustion engine utilizes a crankshaft to transform a reciprocating piston motion into a rotary motion. As the piston moves within its cylinder in response to expanding gases of combustion, rotary motion is imparted to the crankshaft through a connecting rod. One end of the connecting rod is affixed to a wrist pin pivotally secured to the piston, while another end is rotatably journaled about an offset throw of the crankshaft. When multiple cylinder arrangements are desired, the crankshaft is extended to include an additional offset throw for each piston connecting rod.

As the piston transmits force created by the combustion of fuel to the crankshaft by way of the connecting rod, the angularity of the connecting rod causes a considerable side thrust to be exerted by the piston on the walls of the cylinder. Such thrust is generally absorbed by a skirt portion of the piston; that is, the section below the piston rings. Further, this side thrust or angular force absorbs a portion of the linear energy and contributes to the inefficiency of the conversion of the linear movement of the piston into the rotary movement of the crankshaft.

In a conventional internal combustion engine, the crankshaft is supported by main bearings, and at the end of the crank throw, a crank pin holds the connecting rod. In order to compensate for energy lost to angular forces, the piston rod is lengthened and the crank throw is made longer than the radius of the cylinder bore. Thus, additional space must be allowed to accommodate the crank throw. In addition, to avoid a downward thrust of the piston while the piston is at the upper limit of the stroke (top dead center), the crankshaft or crank pin may be offset from the longitudinal center of the cylinder, or alternatively a timing mechanism may be employed to delay spark ignition in the combustion chamber. These factors further contribute to increased size of commercially available internal combustion engines.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with an aspect of the present invention, a device for transferring a reciprocal movement of a piston into a continuous rotary movement of a shaft is provided. The device includes: a double ended piston; two driving surfaces integrally provided between two ends of the double ended piston, wherein the two driving surfaces alternately engage with a surface of the shaft to provide the continuous rotary movement of the shaft; and a traction lubricant to facilitate a tractive contact between the driving surfaces and the surface of the shaft.

In accordance with another aspect of the present invention, a device for transferring a reciprocal movement of a piston into a continuous rotary movement of a shaft is provided. The device includes a double ended piston; a driving surface integrally provided between two ends of the double ended piston; and two cam lobes coupled to the shaft which contact the driving surface to provide continuous rotary movement of the shaft.

In accordance with yet another aspect of the present invention, a multiple cylinder engine configuration is provided. The multiple cylinder engine configuration includes a first four double piston assembly coupled by a first x-shaped web assembly; and a first reciprocating to rotary drive assembly located in a common center area of the first x-shaped web assembly.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other object, advantages and novel features of the invention will become apparent from the following detailed description of the invention when considered in conjunction with the drawings.

DETAILED DESCRIPTION OF THE INVENTION

The present invention relates to an internal combustion engine design that converts reciprocating piston motion into rotary crankshaft motion. The present invention will now be described with reference to the drawings, wherein like reference numerals are used to refer to like elements throughout. It is to be appreciated that the various drawings are not drawn to scale from one figure to another nor inside a given figure, and in particular that the size of the components are arbitrarily drawn for facilitating the reading of the drawings. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

The present invention involves a controlled engagement and disengagement of a crankshaft pinion gear with alternating rack gears on a grouping of double ended pistons. Alternatively, two driving surfaces on the grouping of double ended pistons driving a crankshaft driven surface can employ an elastohydrodynamic lubricant, for example. An internal cam arrangement is employed to provide for the disengagement and re-engagement of the drive to the crankshaft (camming), and to provide the de-acceleration and re-acceleration of the pistons reciprocating over top-dead-center piston position. It is to be appreciated that the term "camming", as used herein, describes a device employed for camming piston assemblies off a reciprocating to rotary drive, over top dead center, and back into the reciprocating to rotary drive. In other words, "camming", as used herein, is not intended to describe cam systems for intake and exhaust valving systems.

Figure 1:
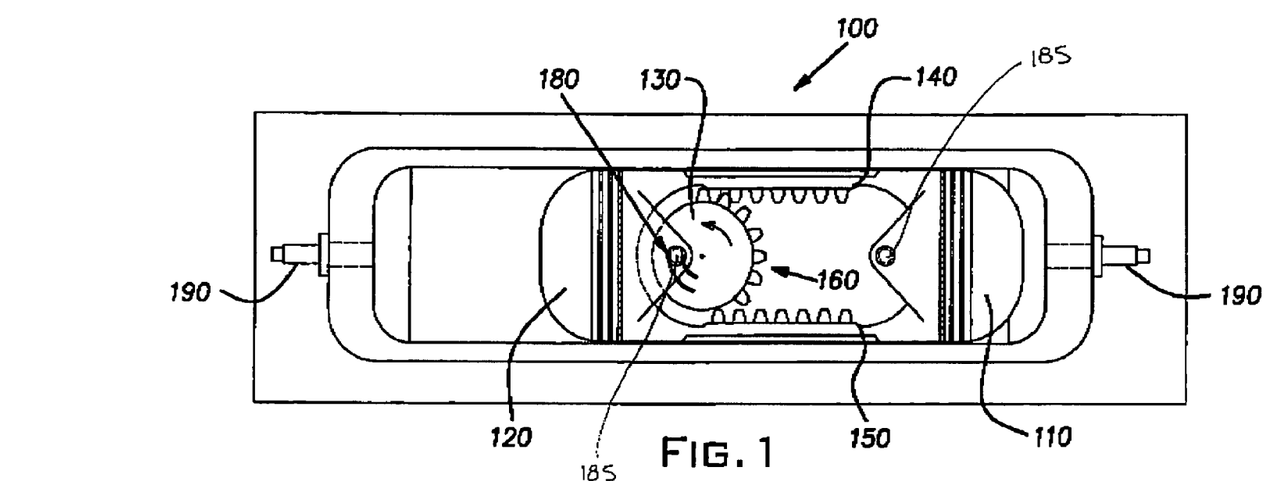
FIG. 1 illustrates a schematic diagram of a reciprocating to rotary engine in accordance with an aspect of the present invention.

Referring initially to FIG. 1, an example of an internal combustion engine design 100 employing a rack and pinion arrangement is illustrated in accordance with an aspect of the present invention. The internal combustion engine 100 comprises a two headed piston, double ended, (common to both pistons) cylinder engine. Intake and exhaust schematic details for engines of the present invention are substantially similar to existing engines and thus have been omitted herein for the sake of brevity. In engine 100, force from reciprocating pistons 110 and 120 is transferred to a rotating crankshaft 130 in a non-angular manner. The reciprocating pistons 110 and 120 are coupled by a first rack 140 and a second rack 150, each having a plurality of teeth 145, 155. Although, FIG. 1 illustrates each rack 140 and 150 having seven teeth, it is to be appreciated that any number of teeth can be utilized. The first and second racks 140 and 150 can be integrally secured to pistons 110 and 120 and can move alternatively in mesh with a toothed sector 160 on the crankshaft 130. Typically, in a conventional engine (not shown), power is transferred in a sinusoidal angular manner such that a driving connecting rod experiences a tangential, leveraged push on a crank journal at one point, momentarily, halfway through the power stroke. In contrast, the engine 100 of the present invention enjoys this tangentially transferred force/motion for most of the piston power stroke.

To provide drive continuity, a cam is provided on the crankshaft 130. The cam includes a ramp 180 to disengage and re-engage the first rack 140 and second rack 150 with a corresponding pin 185. Movement in one direction of the assembly is formed by one of the pistons 110, 120 and its corresponding rack 140, 150, following an explosion in one of the cylinders, the explosion being facilitated by a spark plug 190. The explosion causes one of the racks 140, 150 to mesh with the toothed sector 160, which in turn, rotates the shaft. At the end of the meshing period, the cam cooperates with a roller of one of the pistons 110, 120 so as to facilitate continuity of the drive. Then, an explosion occurs in the other cylinder causing movement of the assembly in an opposite direction and so meshing of the other rack 140, 150 with the toothed cam set 160, continuing the transformation of power to the shaft. Alternatives of providing for engagement and disengagement handshake of piston racks and crankshaft piston can also be employed. For instance, a separate crankshaft chamber with a crankshaft mounted cam lobe rotating with a cam ramp interior cut fab, which is mounted directly to an adjacent piston assembly, can be utilized.

The present invention provides more efficient transfer of power between the reciprocating pistons 110 and 120 and crankshaft 130 as most power is transferred back and forth between the pistons 110 and 120 and crankshaft 130 tangentially at an outside circumference area of the crankshaft 130. In contrast, the conventional connecting rod only enjoys this area of power transfer tangentially at an outside circumference area of the crankshaft momentarily at a point halfway through each of its piston strokes.

Moreover, the present invention provides for: less internal friction as there are no side forces acting on piston skirts as is present in conventional connecting rod engines; fewer moving parts than in conventional connecting rod engines; smaller overall dimensions for similar displacement; and smaller cooling and anti-vibration requirements. Additionally, a sliding transmission block can be provided within the engine to provide crank rotation to be directly powered by a multiple of piston reciprocations versus just one per revolution in a two stroke, or two crank revolutions per crank revolution in a four stroke. The present invention thus provides for a small displacement high speed engine with a high torque, low speed crank.

Figure 2:
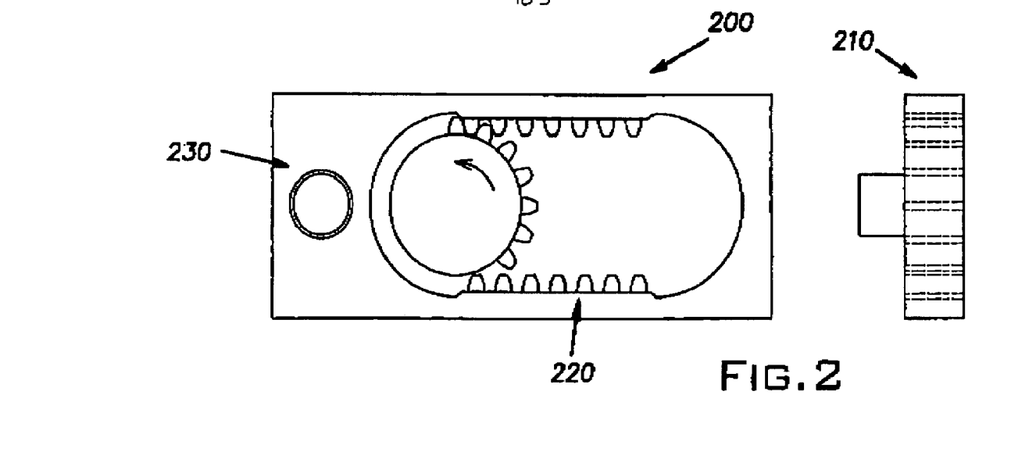
FIG. 2 illustrates a schematic diagram of a reciprocating to rotary crank drive module in accordance with an aspect of the present invention.

Turning now to FIG. 2, a crank drive module 200 for a reciprocating to rotary engine is depicted. The reciprocating to rotary drive 210 is external to a double piston, single cylinder assembly 220 in a multi cylinder engine. A ramp and pin assembly 230 takes the piston assembly 220 over its top dead center position. Alternatively, a cam and inside ramp assembly (not shown) can be employed to take the piston assembly 220 over its top dead center position, as will be explained in further detail herein. An alternative to the rack and pinion type drive can be the utilization of an elastohydrodynamic fluid traction drive. If slippage were an issue, such devices as drives like a desmodromic valve actuation device found in some motorcycle engines could be employed to maintain integrity of relative positioning of pistons to a crankshaft. Another alternative can be an internal to an inside bearing race cam crankshaft journal, connecting rod design, with one assembly for each multi-cylinder assembly.

Figure 3:
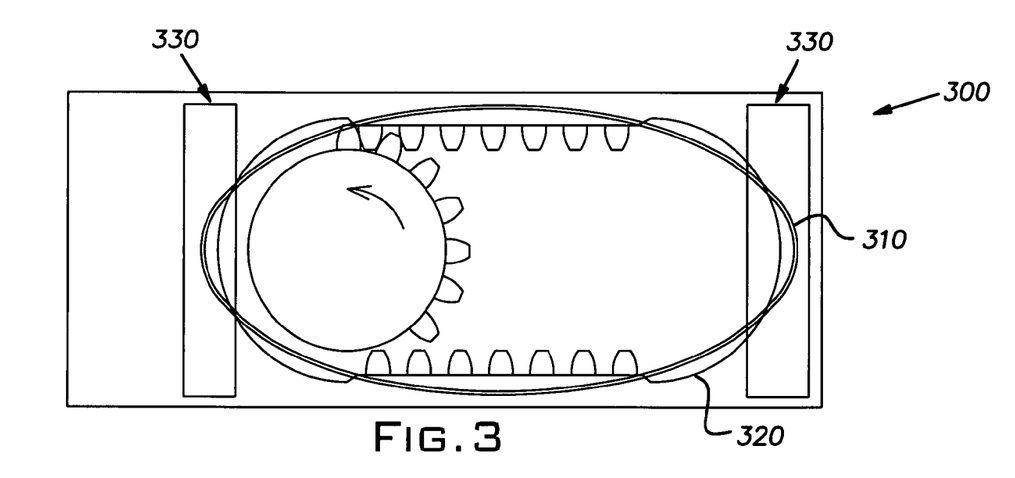
FIG. 3 illustrates a schematic diagram of a rack and pinion configuration in accordance with an aspect of the present invention.

In either of a rack and pinion or an elastohydrodynamic drive, a line of contact, and an over top dead center camming can be designed to provide different starting and terminal accelerations of a piston assembly relative to a center point of a crankshaft, as desirable. An example in a rack and pinion configuration 300, as illustrated in FIG. 3, would be the more sinusoidal accelerations which would occur in the combination of: a) if a gear mesh line, or a line connecting a centrid of each of the gear teeth positioned along one of the driving surfaces, were the line depicted by reference numeral 310 rather than of a mesh line depicted by reference numeral 320, and b) if camming over the top dead center and return were accomplished with more gradual accelerations induced by the camming configurations within the areas at the top dead center area of piston strokes described within the boxed area depicted by reference numeral 330.

Figure 4:
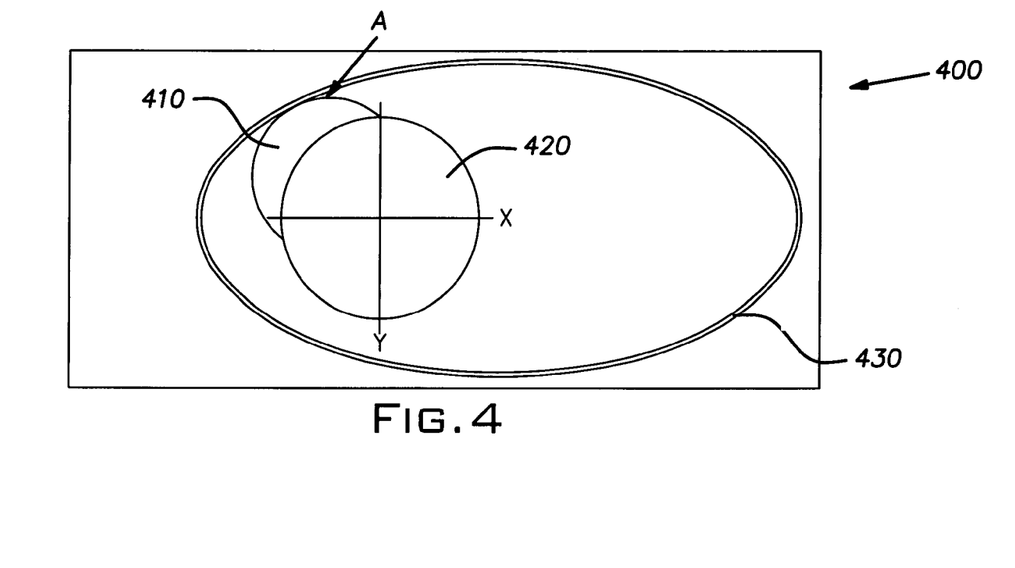
FIG. 4 illustrates a schematic diagram of an elastohydrodynamic drive module in accordance with an aspect of the present invention.

Turning now to FIG. 4, an elastohydrodynamic drive module 400 is depicted in accordance with an aspect of the present invention. A flat surface area depicted by reference numeral 410 partially surrounds a crankshaft 420. There is a line of contact points (shown at contact area A) between the flat surface area 410 and an elliptical surface 430, which replaces the rack in a rack and pinion type drive. The points of contact provide a tractive driving of the points on a surface of the crankshaft 420. Currently, continuously variable transmissions are utilized that employ only four points of contact, although the four points on two, three-dimensionally curved surfaces do deform somewhat to provide more than a single point, infinitely small area of intimate contact. Due at least in part to the line of points of contact, the crank drive module of the present invention enjoys a considerably higher traction coefficient, as the multitude of points can be utilized to transfer the power/force/motion from reciprocating pistons to the crankshaft. Although FIG. 4 shows the flat surface area 410 as an eccentric lobe on the crankshaft 420, and 430 is shown as an elliptical surface, the actual shapes of 410 and 430 would be determined to provide for a preferred combination of combustion dynamics and mechanical piston assembly acceleration dynamics. Further, with an elastohydrodynamic drive, camming and bearing surfaces can be located outside the elastohydrodynamic oil environment. Alternatively, multiple component bearings of a ball, tapered roller, or roller type can be employed to facilitate proper lubrication.

Figure 5:
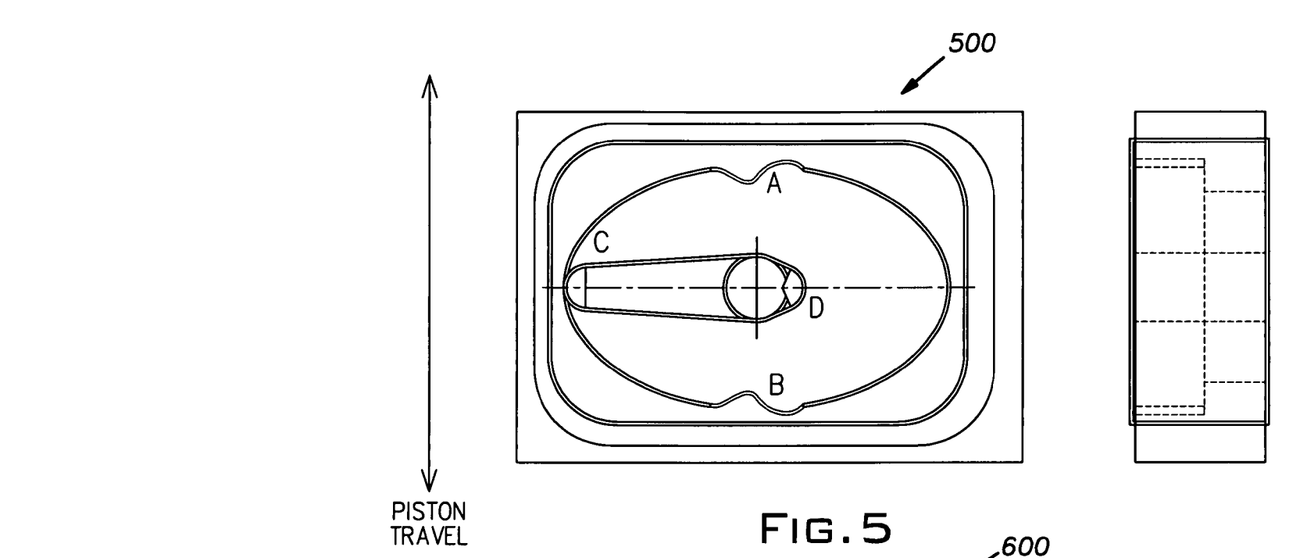
FIG. 5 illustrates a schematic diagram of a gear exchange of a single piston assembly in accordance with an aspect of the present invention.
Figure 6:
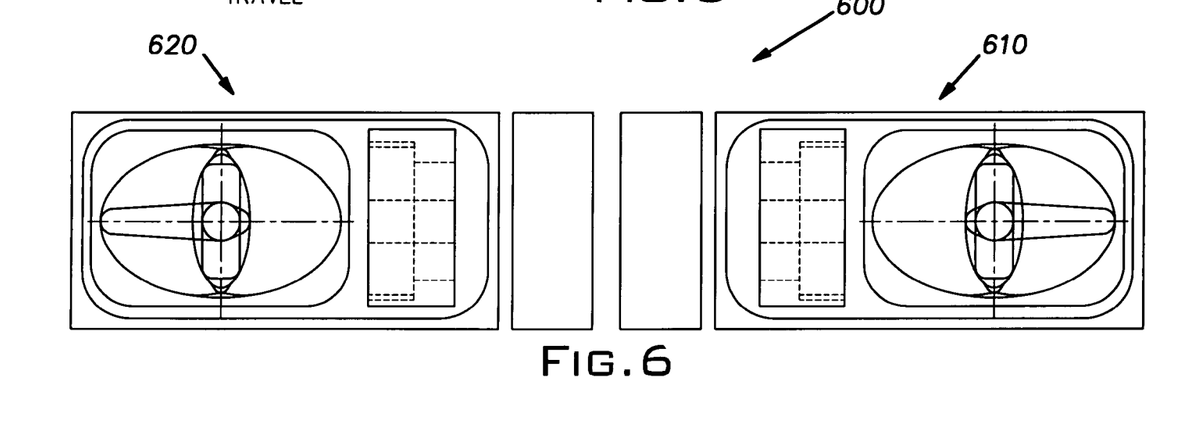
FIG. 6 illustrates a schematic diagram of a gear exchange of a two piston assembly in accordance with an aspect of the present invention.

FIG. 5 illustrates a reciprocating to rotary gear exchange 500 for an eight piston assembly configuration in accordance with an aspect of the present invention. An internal shaped surface can be driven at points A and B by cam lobes C and D, respectively. When cam C rotates to ramping at A, a piston assembly is pushed over top dead center. Then cam D, which if halfway through ramp B, pushes piston assembly from top dead center back down to engage the contact area A. FIG. 6 illustrates a multiple cylinder engine configuration 600. The configuration 600 includes a first eight piston assembly 610 and a second eight piston assembly 620. Each of the two piston assemblies 610 and 620 requires one of the cam assemblies described with respect to FIG. 5.

Figure 7:
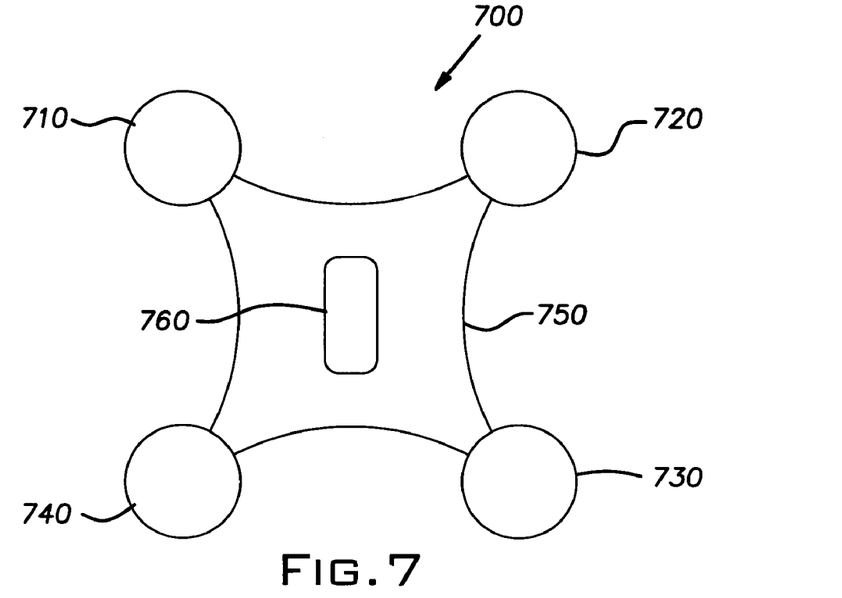
FIG. 7 illustrates a top view schematic diagram of an eight piston assembly in accordance with an aspect of the present invention.

A reciprocating to rotary crank drive module 700 is illustrated in FIG. 7. Circles 710, 720, 730, and 740 depict four double piston assemblies. Each circle 710–740 represents a top view of a forward facing piston. Each forward facing piston 710–740 corresponds with a rearward facing piston (not shown) aligned with the forward facing piston along a Z-axis. The four forward and four rearward facing pistons are connected by an X-shaped web assembly 750, and the reciprocating to rotary drive assembly is located in common center area 760, rather than within a single double ended piston assembly.

Figure 8:
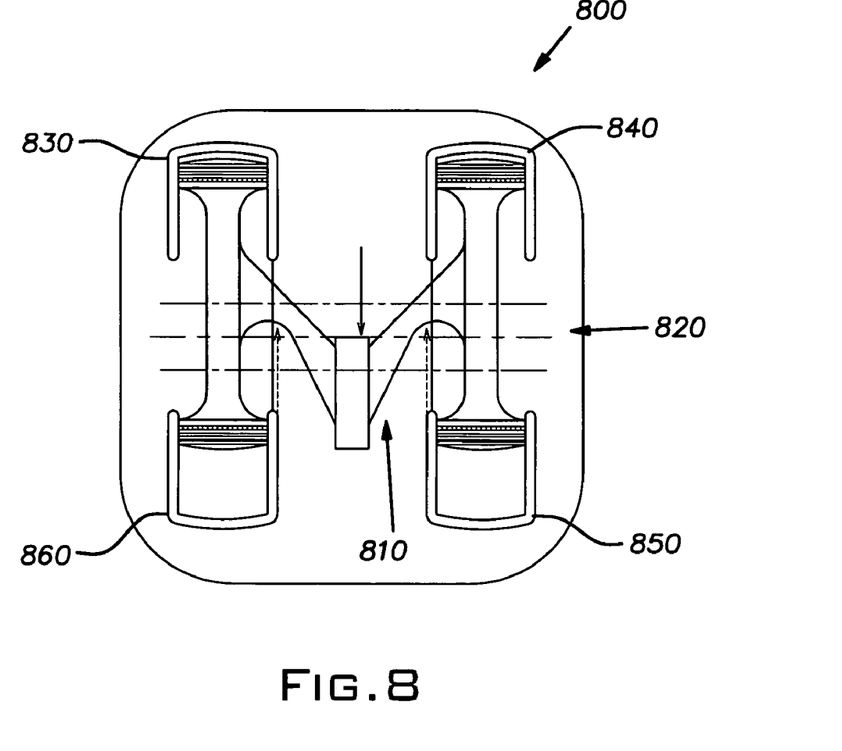
FIG. 8 illustrates a side view schematic diagram of an eight piston assembly in accordance with an aspect of the present invention.
Figure 9:
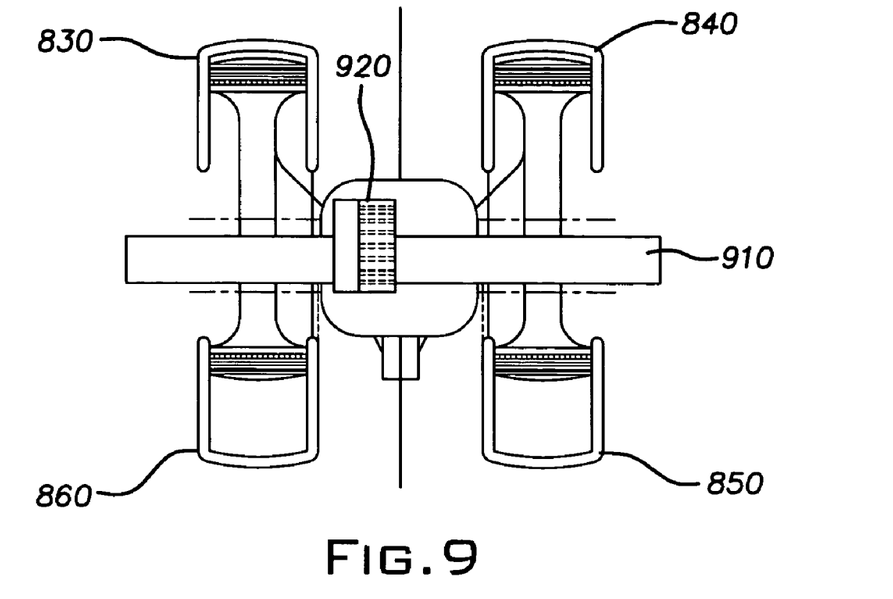
FIG. 9 illustrates a side view schematic diagram of an eight piston assembly in accordance with an aspect of the present invention.

FIG. 8 illustrates a schematic of a reciprocating to rotary crank drive module 800 showing how an eight piston assembly can be constructed such that a web 810, which holds the pistons together, does not cross a vertical center 820. The eight piston assembly includes pistons 830–860 arranged in two double piston assemblies, as well as four additional pistons arranged in two double piston assemblies located directly behind pistons 830–860. A full stroke towards top pistons 830 and 840, as illustrated in FIG. 8, does not extend the web 810 past vertical center 820. Such a configuration allows a second, reverse configuration assembly of eight pistons and four double ended cylinders to be placed in-between the first eight piston assembly to provide for a sixteen piston engine, as will be described in further detail below. FIG. 9 depicts the configuration of cylinders 830–860, crankshaft 910, and reciprocating to rotary drive and camming assemblies 920 relative to one another in the configuration of FIG. 8.

Figure 10:
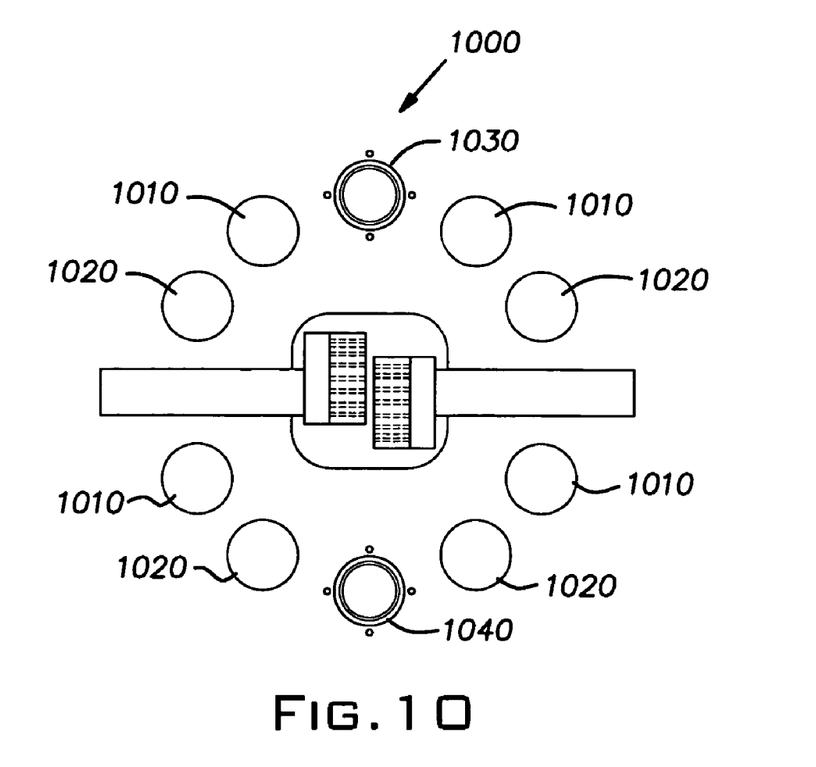
FIG. 10 illustrates a top view schematic diagram of a sixteen piston assembly in accordance with an aspect of the present invention.
Figure 11:
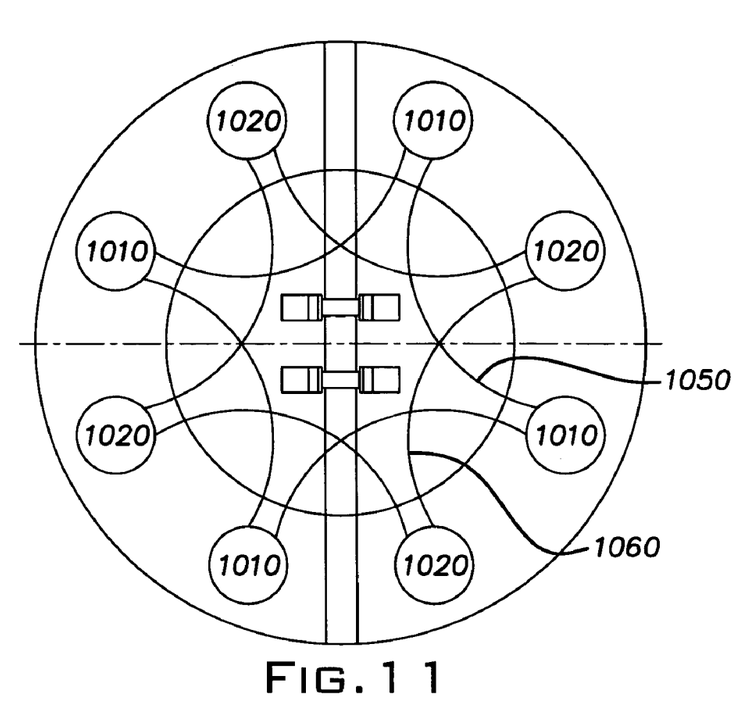
FIG. 11 illustrates another top view schematic diagram of a sixteen piston assembly in accordance with an aspect of the present invention.

Turning now to FIGS. 10 and 11, schematic diagrams of a sixteen piston engine assembly are shown. Circles 1010 and circles 1020 represent first and second eight piston assemblies, respectively. The first and second eight piston assemblies 1010 and 1020 and configured together to form a sixteen piston engine. The first eight piston assembly 1010 is connected by web assembly 1050, while the second eight piston assembly is connected by web assembly 1060. One or more sensors 1030 and 1040 can be coupled to web assemblies 1050 and 1060 to detect imbalances and/or stresses caused by misfiring cylinders, etc.

Figure 12:
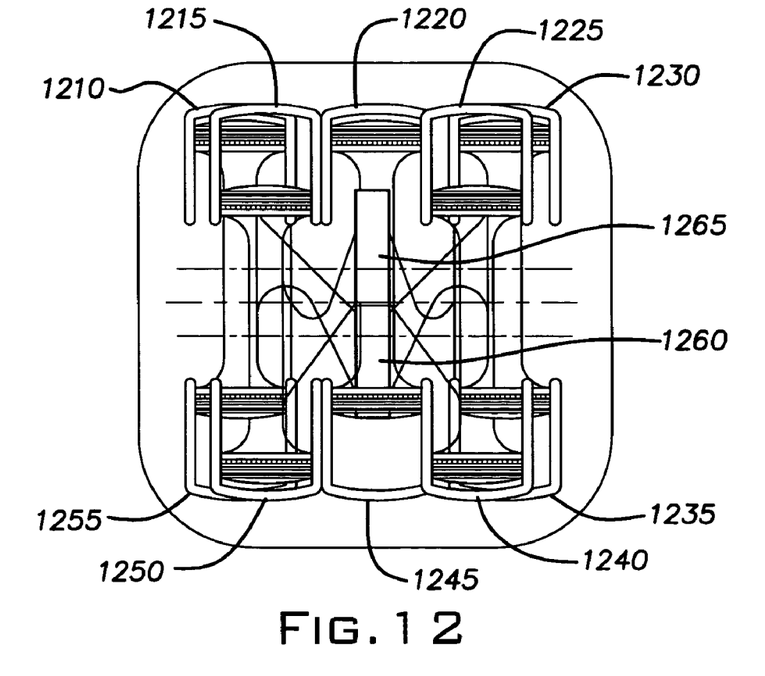
FIG. 12 illustrates a side view schematic diagram of a sixteen piston assembly in accordance with an aspect of the present invention.
Figure 13:
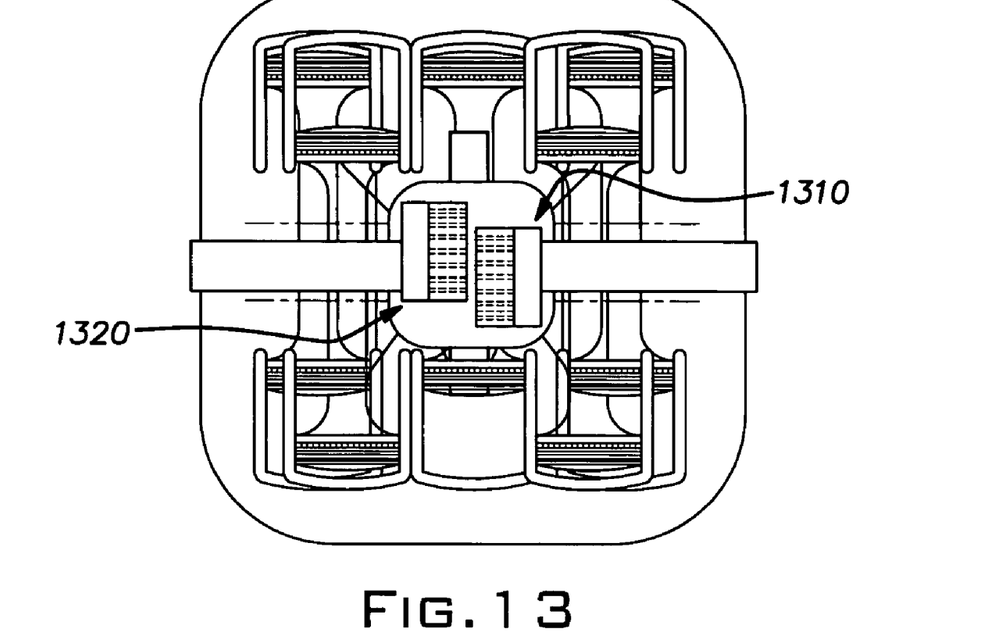
FIG. 13 illustrates a side view schematic diagram of a sixteen piston assembly in accordance with an aspect of the present invention.

FIG. 12 illustrates an example of how a sixteen piston engine 1200 can be configured with two eight piston assemblies. A first eight piston assembly comprises pistons 1210, 1220, 1230, 1235, 1245, and 1255, with two rearward pistons (not shown) located behind center pistons 1220 and 1245. A second eight piston assembly comprises pistons 1215, 1225, 1240, and 1250, with the other four pistons located behind pistons 1215, 1225, 1240, and 1250. Rectangles 1260 and 1265 represent the web assemblies of the first and second eight piston assemblies. As can be seen, the first and second assemblies can both be at opposing top dead centers without the web assemblies 1260 and 1265 interfering with each other. The first eight piston assembly at top dead center is coupled together with rectangle 1260, while the second eight piston assembly at bottom top dead center is coupled at rectangle 1265. FIG. 13 illustrates the sixteen piston engine of FIG. 12, while additionally depicting a relative configuration and location of reciprocating to rotary drives and camming drives 1310 and 1320.

Figure 14:
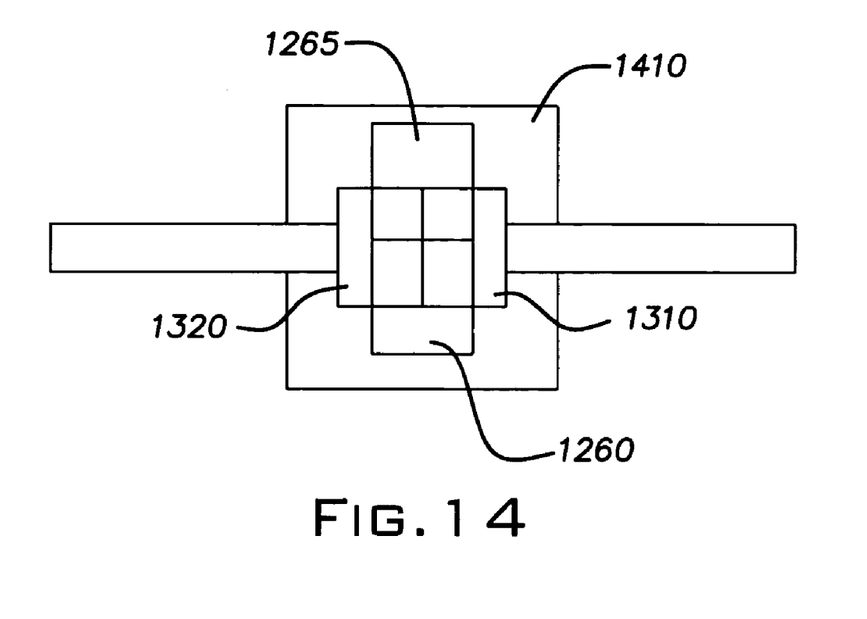
FIG. 14 illustrates a schematic diagram of web centers in accordance with an aspect of the present invention.

FIG. 14 illustrates the first and second web assemblies, represented by rectangles 1260 and 1265 in FIG. 12. The first and second web assemblies 1260 and 1265 are offset and opposite to allow the reciprocating to rotary drive and the top dead center camming assemblies 1310 and 1320 to be co-located in a substantially same central crankcase area 1410.

Although the schematic diagrams illustrated herein depict multiple cylinders, each containing an opposing double piston assembly in a cylindrically arranged configuration, it is to be appreciated that a single cylinder, single piston engine, or a multiple cylinder, conventionally aligned, V style, in-line style, or opposed in-line style multi-cylinder engine, and/or any other suitable configuration can also employ the reciprocating to rotary concept of the present invention.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A device for transferring a reciprocal movement of a piston into a continuous rotary movement of a shaft comprising:
   a double ended piston;
   two driving surfaces integrally provided between two ends of the double ended piston, wherein the two driving surfaces alternately engage with a surface of the shaft to provide the continuous rotary movement of the shaft; and
   a ramp and pin assembly to take the device over a top dead center position.

2. The device of claim 1, wherein the two driving surfaces are substantially flat.

3. A device for transferring a reciprocal movement of a piston into a continuous rotary movement of a shaft comprising:
   at least one double ended piston; and
   at least one cam assembly comprising:
      a driving surface integrally provided between two ends of the at least one double ended piston; and
      two cam lobes coupled to the shaft which contact the driving surface to
      provide continuous rotary movement of the shaft,
      wherein the driving surface includes at least two ramp shaped areas to push the cam lobes over a top dead center position.

4. A device for transferring a reciprocal movement of a piston into a continuous rotary movement of a shaft comprising:
   at least one double ended piston; and
   at least one cam assembly comprising:
      a driving surface integrally provided between two ends of the at least one double ended piston; and
      two cam lobes coupled to the shaft which contact the driving surface to provide continuous rotary movement of the shaft,
   further comprising at least two double piston assemblies and at least two cam assemblies, wherein each of the double piston assemblies includes one cam assembly to push the respective double piston assembly over a top dead center position.

5. A multiple cylinder engine comprising:
   a first four double-ended piston assembly rigidly coupled by a first x-shaped web assembly; and
   a first reciprocating to rotary drive assembly located in a common center area of the first x-shaped web assembly.

6. The multiple cylinder engine of claim 5, wherein the first reciprocating to rotary drive assembly includes a rack and pinion type drive.

7. The multiple cylinder engine of claim 5, wherein the first reciprocating to rotary drive assembly includes a fluid traction drive.

8. The multiple cylinder engine of claim 5, wherein the first reciprocating to rotary drive assembly includes a cam and ramp assembly to push the piston assemblies over their respective top dead center positions.

9. A multiple cylinder engine comprising:
   a first four double piston assembly coupled by a first x-shaped web assembly; and
   a first reciprocating to rotary drive assembly located in a common center area of the first x-shaped web assembly,
   further comprising a second four double piston assembly coupled by a second x-shaped web assembly and a second reciprocating to rotary drive assembly located in a common center area of the second x-shaped web assembly.

10. The multiple cylinder engine of claim 9, wherein the second reciprocating to rotary drive assembly includes a rack and pinion type drive.

11. The multiple cylinder engine of claim 9, wherein the second reciprocating to rotary drive assembly includes a fluid traction drive.

12. The multiple cylinder engine of claim 9, wherein the second reciprocating to rotary drive assembly includes a cam and ramp assembly to push the piston assemblies over their respective top dead center positions.

13. The multiple cylinder engine of claim 9, wherein the first and second x-shaped web assemblies are offset and opposite to allow the first and second reciprocating to rotary drive assemblies to be colocated in a central crankcase area.

14. A device for transferring a reciprocal movement of a piston into a continuous rotary movement of a shaft comprising:
   a double ended piston; and
   two driving surfaces integrally provided between two ends of the double ended piston,
   wherein the two driving surfaces alternately engage with driven surfaces of the shaft to provide the continuous rotary movement of the shaft,
   wherein one or both of the two driving surfaces are nonlinear and are configured to impart a motion that is best for combustion, and
   wherein if at least one of the driving surfaces include gear teeth, a line connecting a centroid of each of the gear teeth positioned along one of the driving surfaces is nonlinear, and
   wherein a shape of the nonlinear line connecting the centroid of each of the gear teeth position along one of the driving surfaces directly alters a motion of the piston.

15. The device of claim 14, wherein the driving surfaces are substantially flat.

16. The device of claim 15, further comprising a traction lubricant to facilitate a tractive contact between the driving surfaces and the driven surfaces of the shaft.

17. The device of claim 14, wherein the driving surfaces include a gear-toothed profile.

18. The device of claim 14, further comprising a ramp and pin assembly to take the device over a top dead center position.

19. The device of claim 14, wherein the driven surfaces of the shaft are flat and nonlinear.

20. The device of claim 14, wherein the driven surfaces of the shaft include gear teeth and wherein a line connecting a centroid of each gear tooth on the driven surfaces is noncircular.

21. The device of claim 14, wherein motion of the shaft when in contact with the driving surfaces is nonlinear.

* * * * *